March 10, 1959 R. W. STEVENS 2,876,761
HELICOIDAL STONE-SAWING WIRE
Filed March 1, 1957

INVENTOR
ROGER W. STEVENS,
By: Donald G. Dalton
his Attorney.

United States Patent Office 2,876,761
Patented Mar. 10, 1959

2,876,761

HELICOIDAL STONE-SAWING WIRE

Roger W. Stevens, Woodbury, Conn., assignor to United States Steel Corporation, a corporation of New Jersey Application March 1, 1957, Serial No. 643,319

4 Claims. (Cl. 125—21)

The present invention relates generally to saw wire and more particularly to an improved helicoidal saw wire especially suitable for cutting stone, marble, granite and the like.

Conventional helicoidal stone-sawing wire is essentially a length of flat steel strip of suitable composition twisted about itself to form a saw wire having helical flutes with lands therebetween extending along its length. In use the helical flutes provide cutting edges while the lands therebetween function to conduct liquid suspended emery, sand, steel particles or similar abrasive material to the saw cut. Due to the physical nature of stone, marble, granite and other mineral substances worked on, the flutes of the helicoidal stone-sawing wire in use prior to my invention wore rapidly so that it was necessary to discard the saw wire and replace it after a relatively short period of use. At discard the formation of the helical flutes with lands therebetween had almost disappeared. At discard size the diameter of the saw wire was approximately equal to the thickness of the flat strip from which it was formed. When this point of wear was reached, the abrasive carrying voids between the flutes became so small in relation to the work-contacting surfaces of the wire, that efficiency of cutting was lost. When the abrasive-carrying voids are greatly diminished in size or eliminated, the cutting action of the saw wire is greatly diminished and if the cutting operation is continued without the benefit of the abrasive-carrying voids, an irregular or otherwise faulty cut would probably result.

Increasing the thickness of the flat strip used to form the saw wire cannot increase the life of the saw wire since the greater thickness would cause the saw wire to be worn to the point of discard earlier. The reason for this, as pointed out above, is that the abrasive-carrying voids in the saw wire disappear at a worn diameter approximately equal to the thickness of the worn saw wire. For example, a helicoidal saw wire composed of flat wire .075" thick would become devoid of abrasive-carrying lands when worn to a diameter of .075", while the abrasive-carrying lands of helicoidal saw wire made from strip .100" thick would disappear when the diameter of the saw wire was worn to .100". Thus, use of a thicker strip to form the helicoidal saw wire causes the saw wire to become ineffective at a larger diameter than when thinner strip is used.

The use of a thinner strip than is normally used to make helicoidal stone-sawing wire causes the saw wire to wear out faster. Such thin wire also has the tendency of stretching excessively so that as the point of discard is approached there is present the danger of the saw wire breaking with consequent hazardous and uneconomical results.

In order to increase the useful life of helicoidal saw wire, I propose to form the saw wire from a length of generally rectangular shaped wire which is thinner between its side edges than at its edges. The use of such shaped wire for making the helicoidal saw wire increases the useful life of the saw wire by decreasing the diameter at which the worn saw wire must be discarded because of disappearance of the abrasive-carrying voids therefrom. At the same time the thicker edge sections provide longer lasting cutting edges.

It is accordingly the primary object of my invention to provide a longer wearing helicoidal stone-sawing wire made of metal strip which is thinner between its edges than at its edges.

It is a further object of the present invention to provide a helicoidal stone-sawing wire having helical flutes with lands therebetween extending along its length characterized by a groove extending longitudinally along the centers of the lands.

It is another object of my invention to provide a helicoidal stone-sawing wire of the character described in the foregoing object, the helical flutes and lands of adjacent sections of the wire extending in opposite directions.

It is another object of my invention to provide a helicoidal stone-sawing wire having helical flutes with lands therebetween extending along its length characterized by a discontinuous groove extending longitudinally along the centers of the lands.

These and other objects will become more apparent after referring to the following specification and attached drawings, in which.

Figure 1:
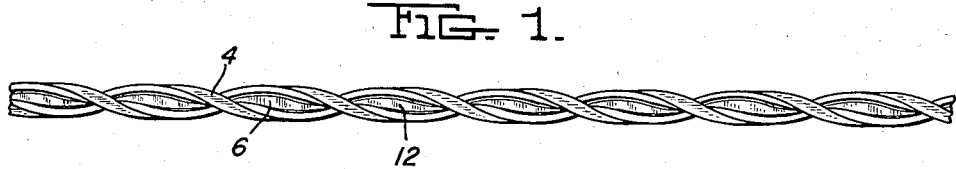
Figure 1 is a plan view of a length of one form of the saw wire of my invention.
Figure 2:
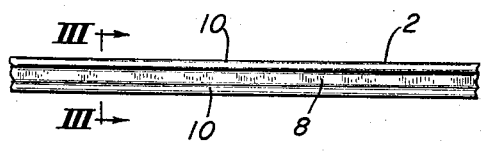
Figure 2 is a plan view of a length of the strip from which the wire of Figure 1 is formed.
Figure 3:
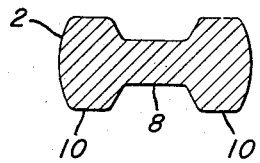
Figure 3 is a cross-sectional on the plane of line III—III of Figure 2.

Referring more particularly to the drawings, Figure 1 illustrates a length of one form of saw wire made according to my invention. The saw wire of Figure 1 is made from a length of hard steel strip 2, which is generally bow shaped in cross section, twisted about its longitudinal axis to form helical flutes 4 and lands 6 extending along the length of the saw wire. As shown in Figure 3, the strip 2 is thinner in its center portion 8 than at its side edges 10. When the saw wire is formed by twisting strip 2 the center portions of the lands 6 are provided with a groove 12 as a result of the thinner center portion 8 of the strip 2.

Figure 4:
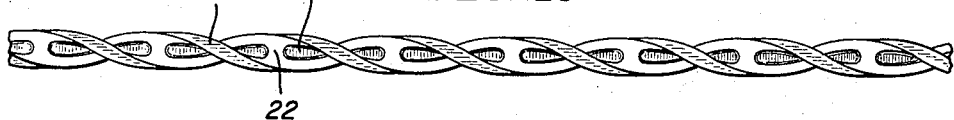
Figure 4 is a plan view of a length of another form of saw wire embodying my invention.
Figure 5:
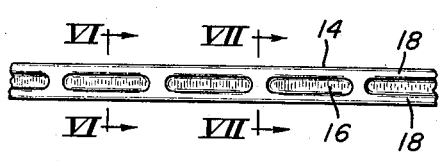
Figure 5 is a view similar to Figure 2 of a length of the strip from which the wire of Figure 4 is formed.
Figures 6, 7:
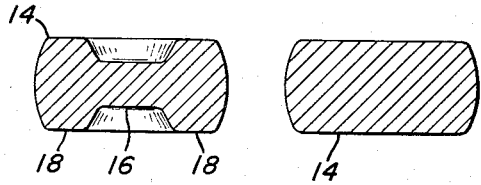
Figure 6 is a cross-sectional view taken on the plane of line VI—VI of Figure 5.
Figure 7 is a view similar to Figure 6 taken on the plane of line VII—VII of Figure 5.

Figure 4 illustrates another form of saw wire embodying my invention. The length of saw wire shown in Figure 4 is formed from a strip of steel 14 having a discontinuous center portion 16 between its side edges 18 which is thinner than the edges. Thus, when the strip 14 is twisted about itself to form helical flutes 20 and lands 22 therebetween, a discontinuous center groove 24 is formed in the lands 22.

Figure 8:
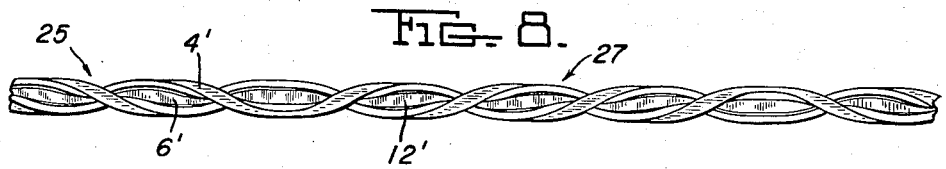
Figure 8 is a plan view of a length of another form of saw wire embodying my invention.

For certain types of work it is desirable that the direction of the helical flutes and lands of helicoidal saw wire be reversed at intervals. Figure 8 illustrates a form of saw wire according to my invention similar to that shown in Figure 1 with the exception that adjacent sections 25 and 27 of the former are provided with oppositely directed helical flutes and lands. Parts in Figure 8 similar to parts in Figure 1 are indicated by the same reference numerals primed.

Figure 9:
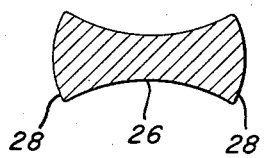
Figures 9, 10 and 11 are cross-sectional views of some other forms of strip which may be used to form saw wire according to my invention.
Figure 10:
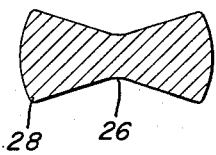
Figure 11:
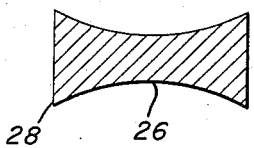

Figures 9, 10 and 11 illustrate, in cross section, other forms of strip each having a center portion 26 between its side edges 28 which is thinner than the side edges, that may be used in forming helicoidal saw wires according to the invention.

By forming the helicoidal stone-sawing wire from metal strip which is thinner at its center between its side edges than at ts edges, both the discarding diameter and the condiion of the material contacting surfaces prior to discarding can be influenced to the advantage of the user. By this expedient an edge thickness can be selected which gives the desired wearing surface and at the same time a diameter for discarding can be selected which will cause the wire to possess satisfactory strength without the disadvantage of the abrasive-carrying voids disappearing at such an early stage that it is necessary to discard the sawing wire at a diameter which is economically undesirable.

As an example of a strip size having a dimensional ratio found suitable for use in forming saw wire according to the invention is the following:

Width—.25"
Thickness at side edges—.125"
Thickness of center portion between side edges—.075"

The immediately foregoing data are cited merely as an example and it is to be noted that other sizes of strip having center portions between their side edges which are thinner than the side edges of the strip may be used.

While several embodiments of my invention have been shown and described, it will be apparent that other adaptations and modifications may be made without departing from the scope of the following claims.

I claim:

1. A helicoidal saw wire consisting of a metal strip having a portion of reduced thickness intermediate the side edges thereof and extending discontinuously along its length, said strip being twisted about its longitudinal axis to form helical grooves along its length.

2. A helicoidal saw wire consisting of a metal strip havng a portion of reduced thickness intermediate the side edges thereof and extending discontinuously along its length, said strip having adjacent sections twisted about its longitudinal axis to form opposed helical grooves, the helical grooves in adjacent sections being twisted in opposite directions.

3. A helicoidal saw wire consisting of a metal strip having a generally rectangular cross-section with a portion of reduced thickness intermediate the side edges thereof and extending along its length, said side edges constituting the cutting edges of said saw wire, said strip being twisted about its length to direct said cutting edges helically and to form a helical groove extending along its length between said cutting edges.

4. A helicoidal saw wire as defined by claim 3 characterized by said strip having adjacent sections twisted about its longitudinal axis to form opposed helical grooves, the helical grooves in adjacent sections being twisted in opposite directions.

References Cited in the file of this patent

UNITED STATES PATENTS

| 379,835 | Turrettini | Mar. 20, 1888 |
| 1,662,488 | Burkhardt | Mar. 13, 1928 |
| 1,687,089 | Green | Oct. 9, 1928 |

FOREIGN PATENTS

| 802,784 | France | Sept. 15, 1936 |